(12) United States Patent
Darling et al.

(10) Patent No.: US 6,465,580 B1
(45) Date of Patent: Oct. 15, 2002

(54) FUNCTIONAL POLYMERS WITH CARBON-LINKED FUNCTIONAL GROUPS

(75) Inventors: Graham D. Darling, Russell; Brent R. Stranix, Pont-Claire; Jian Ping Gao, Gloucester, all of (CA)

(73) Assignee: Active Materials, Inc., Ottawa (CA)

( * ) Notice: Subject to any disclaimer, the term of this patent is extended or adjusted under 35 U.S.C. 154(b) by 0 days.

(21) Appl. No.: 09/555,309

(22) PCT Filed: Nov. 27, 1998

(86) PCT No.: PCT/CA98/01087

§ 371 (c)(1), (2), (4) Date: Jul. 7, 2000

(87) PCT Pub. No.: WO99/28355

PCT Pub. Date: Jun. 10, 1999

(30) Foreign Application Priority Data

Nov. 28, 1997 (CA) ............................................. 2223114

(51) Int. Cl.$^7$ .................................................. C08F 8/30

(52) U.S. Cl. .................... 525/332.2; 521/31; 521/32; 521/33; 525/340; 525/343; 525/366; 525/374; 525/375; 525/376; 525/383; 525/385; 525/386

(58) Field of Search ............................... 525/332.2, 340, 525/343, 366, 374, 375, 376, 383, 385, 386; 521/31, 32, 33

(56) References Cited

U.S. PATENT DOCUMENTS

| | | | |
|---|---|---|---|
| 3,985,715 A | 10/1976 | Gray | |
| 4,256,859 A | 3/1981 | Woo | |
| 5,350,523 A * | 9/1994 | Tomoi et al. | ................. 521/32 |
| 5,466,758 A | 11/1995 | Yoon-Sik | |

FOREIGN PATENT DOCUMENTS

| | | |
|---|---|---|
| DE | 16 42 802 | 5/1971 |
| EP | 0 152 780 | 8/1985 |
| EP | 0 304 377 | 2/1989 |
| EP | 0 687 691 | 12/1995 |
| GB | 714 366 | 8/1954 |
| GB | 714366 | 8/1954 |
| JP | 60 177006 | 9/1985 |
| WO | 96 08949 | 3/1996 |
| WO | WO 96/08949 | 3/1996 |
| WO | WO 97/05175 * | 2/1997 |
| WO | 97 27226 | 7/1997 |
| WO | WO 97/27226 | 7/1997 |

OTHER PUBLICATIONS

Patent Abstracts of Japan, vol. 010, No. 023 (c–325), Jan. 29, 1986.
Kai Li, Macromolecular Chemistry and Physics, 195(2):391.
Chemistry Abstracts, 100(16):38, Abstract No. 122161g, col. 2.
Kai Li, Lorenzo P. Ferrari, Chris Brown, Harold D. H. Stover; New crown ether resins prepared by cationic template polymerization; 1297 Macromolecular Chemistry and Physics, 195 (Feb. 1994), No. 2, Basel, CH.
Chemical Abstracts, 115(24):21, Abstract No. 256944h, Divinylbenzene–styrene colpoymers with bonded aza–15–crown–5 units.
Chemical Abstracts, Abstract No. 122161g, Resin–bonded diasazo crown ethers.
The Peroxide Effect in the Addition of Reagents to Unsaturated Substances., Walling, Cheves; Kharasch, M.S.; and Mayo, F.R.; (Oct. 1939).
Amidation and Mainoalkylation of Olefins: Blocking Techniques in Radical Chain Reactions, Friedman, Lest; Tetrahedron Letters No. 7, pp. 238–242, (1961).
Free Radical Additions to Olefins to Form Carbon–Carbon Bonds, Walling, Cheves, Organic Reactions, vol. 13, pp. 91–149 (1963).
Reaktive Mikrogele, 5*, Obrecht, Werner; Seitz, Ulrich; and Funke, Werner; Makromol. Chem. 177, 2235–2240 (1976).
Persistent Carbon–Centered Radicals, Griller, David and Ingold, Keith U.; Accounts of Chemical Research, vol. 9, pp 13–19 (1976).

(List continued on next page.)

Primary Examiner—Bernard Lipman
(74) Attorney, Agent, or Firm—Oppedahl & Larson LLP

(57) ABSTRACT

A functional polymer having active and stable functional groups, for separation or reactive processes in chemical manufacture or analysis, has carbon-linked functional groups on dimethylene spacers; a method of preparation is from pre-existing polymers comprising polymeric 1-(vinylphenyl)ethylene repeat units, by treating with H—X in the presence of free radicals, wherein X comprises a carbon atom that is linked to the —CH[Ph-$CH_2CH_2$—]—$CH_2$— remainder of said —CH[Ph-$CH_2CH_2$—X]—$CH_2$— repeat unit in said product as a consequence of said reaction; the carbon atom can have characteristics selected from being $sp^2$-hybridized and doubly bonded to an oxygen, being $sp^3$-hybridized and singly bonded to an oxygen, being $sp^3$-hybridized and singly bonded to a nitrogen that is also singly bonded to an $sp^2$-hybridized carbon, being $sp^3$-hybridized and singly bonded to a nitrogen and also to an $sp^2$-hybridized carbon, and being $sp^3$-hybridized and singly bonded to two $sp^2$-hybridized carbons; H—X may comprise an N-alkylamide, N-alkyl urea, crown ether, aza crown ether, polyethylene glycol, N-alkyl amidine, amino acid residue, 1,3-diketone, 1,3-diester, or combinations thereof; H—X may be N-methyl pyrrolidinone, dimethyl acetamide, tetramethylurea, N,N'-dimethylpropyleneurea, 1,8-diazabicyclo[5.4.0]undec-7-ene, 2,4-pentanedione, diethylmalonate, 18-crown-6, dicyclohexano-18-crown-6, polyethyleneglycol methyl ether 350 g/mol, 2-chloroethyl ether, 2-hydroxyethyl ether, N-methylmorpholine or N-acetyl leucine; functional groups are afforded that comprise ether, polyether, crown ether, cryptand, lariat ether, amide, urea, amidine, ester, amine, carboxylic acid, or combinations thereof.

18 Claims, 1 Drawing Sheet

OTHER PUBLICATIONS

Revisited IR Analysis, Bartholin, Michel; Makromol. Chem., vol. 182 pp 2075–2085, (1981).

Chelated Cross–Lined Elastomers, Yeh, Horng Chin and Anderson, N.H.; Polym—Prepr., vol. 22, pp 184–185 (1981).

Funcationalized Resins, Grafting of Functionalized Monomers on Macroporous Styrene–Divinyl Benzene Resins, Brunelet, Thierry, Bartholin, Michel and Guyot, Alain; Die Angewandte Makromoledulare Chemie, 106 (1982) 79–90.

Chemically Modified Polystyrene Containing Pendant Vinyl Groups: a photosensitive polymer exhibiting chemical amplification, Farrall, M. Jean, Alexis, Michele and Trecarten, Mark; Polymer, vol. 24, (1983) pp 114–117.

Polymer–supported bases: Polystyrene–supported 1,8–diazabicyclo[5.4.0]undec–7–ene as reagent in organic systhese, Tomoi, Masao, Kato, Youichi and Kakiuchi, Hiroshi; Makromol. Chem. vol. 185, pp. 2117–219 (1984).

Resin–bonded disazo crown ethers, Plastics Manuf., vol. 100, p. 38–39 (1984).

A New Styrene Derivative and its Application to Reactive Polymer Synthesis, Yamamizu, Takafumi, Akiyama, Minoru and Takeda, Kunihiko; Reactive Polymers, vol. 3 (1985) 173–179.

Polymer–supported cyclic amidines, Plastics Fabr., Uses, vol. 104 (1986) pp 75.

Soluble poly(divinylbenzene): Reaction mechanism for the anionic polymerization of divinylbenzene with lithiium diisopropylamide as catalyst, Nagasaki, Yukio, Ito, Hiromi and Tsuruta, Teiji; Makromol Chem. vol. 187, pp. 23 (1986).

ACS Symposium Series: Mechanistic Aspects of Phase–Transfer Free Radical Polymerizations, Rasmussen, Jerald K., Heilmann, Steven M., Krepski, Larry R. and Smith II, Howell K.; American Chemical Society, c. 10, pp 116–127 (1987).

Heterocyclic Polymers as Catalysts in Organic Synthesis. Efffect of Macromolecular Design and Microenvironment on the Catalytic Activity of Polymer–Supported (Dialkylamino)pyridine Catalysts, Deratani, Andre, Darling, Graham D., Horak, Daniel and Frechet, Jean M.J.; Macromolecules, vol. 20, No. 4, pp. 767–772 (1987).

Crown Ether Polymers as Funtional Polymers in Analytical Chemistry, Kimura, Keiichi and Shono, Toshiyuki; Functional Monomers and Polymers, c. 7 pp 349–373 (19870.

Synthesis and Separations Using Functional Polymers, Sherrington, D.C. and Hodge, P.; John Wiley & Sons, (1988).

Dimethylene Spacers in Functionalized Polystyrenes, Darling, Graham D., and Frechet, Jean M.J.,; ACS Symposium Series: Chemical Reactions on Polymers, c. 2 pp 24–36 (1988).

Polymer–Bound Thiamine Models. IV. A Simple Synthetic Route to Immobilize a Thiazolium Salt to Macroreticular Polystyrene Resins via a Dimethylene Spacer, Faber, M.C., van der Berg, H.J. and Challa, G.; Reactive Polymers, vol. 11,. (1989) 117–126.

Polymeric Catalysts: Polymeric Phase Transfer Catalysts, Akelah, A and Moet, A., c. 4.5 pp 110–120 (1990).

Divinylbenzene–styrene copolymer with bonded aza–15–crown–5 units, 35–Synthetic High Polymers, vol. 115, (1991) p. 21.

Reactions of Benzaldehyde with Diethylzinc Catalysed by a Novel Type of Polymer–Supported N–Benzyl– or n–alkyl–(1S,2R)–ephedrines, Zhengpu, Zhang, Hodge, P. and Stratford, P.W.; Reactive Polymers, vol. 15 (1991) 71–77.

Funtional Polymers Containing Dimethylene Spacers, Gao, Jian Ping, Morin, Frederick G. and Darling, Graham D.; Macromolecules, vol. 26, No. 5 (1993) pp 1196–1198.

New crown ether resin prepared by cationic template polymerization, Lorenzo, Kai Li, Ferrari, P., Brown, Chris and Stover, Harold D.H.; Macromol. Chem. vol. 195, 391–399 (1994).

Monolithic, "Molded", Porous Materials with High Flow Characteristics for Separations, Catalysis, or Solid–Phase Chemistry: Control of Porous Properties during Polymerization, Viklund, Camilla, SVEC, Frantisek and Frechet, Jean M.J.; Chem. Mater. vol. 8, No. 3 (1996) pp 744–750.

Functional Polymers from (Vinyl)polystyrene. Solid–phase Reagents, Catalysts, Supports and Fluorescent Sensors, Stranix, Brent R., Ph.D. Thesis, Department of Chemistry, McGill Univeristy (1997).

* cited by examiner

US 6,465,580 B1

FUNCTIONAL POLYMERS WITH CARBON-LINKED FUNCTIONAL GROUPS

TECHNICAL FIELD

This invention relates to a functional polymer comprising active and stable functional groups, and to a method of preparing the same. More particularly, the present invention relates to a functional polymer that comprises repeat units of the form —CH[Ph-CH$_2$CH$_2$—X]—CH$_2$—, where X is a functional group linked through carbon, and to a method of its preparation.

BACKGROUND ART

Functional polymers are widely used in industry as separation media and as solid-phase reagents, catalysts and protecting groups for analytical or preparative chemical applications and processes [D. C. Sherrington and P. Hodge, "Syntheses and Separations Using Functional Polymers", John Wiley & Sons, Toronto, 1988]. A functional polymer generally consists of a polymer matrix, in the form of particles, beads or a porous block [C. Viklund, F. Svek, J. M. J. Fréchet and K. Irgum, "Molded porous materials with high flow characteristics for separation or catalysis: control of porous properties during polymerization in bulk solution", Chem. Mater. y1986 v8 p744–750], that is chemically inert to the conditions of its use, including being insoluble in any solvent it is likely to encounter so that it can be retained in a column or easily recovered from out of a product mixture by filtration or other separation for easy isolation of chemical product and reuse of the functional polymer; and also of functional groups, attached to the polymer matrix, that can bind, transform or otherwise interact with chemical species that are dissolved in a permeating fluid, or that confer other advantageous properties to the functional polymer, such as a higher density for best use in floating bed reactors or for easier and faster separation by precipitation, or better wetting and penetration by a particular solvent. Most often, the polymer matrix is of crosslinked polystyrene, due to the ease of its preparation through suspension or other polymerization of styrene or styrene-like monomer (usually, including divinylbenzene as crosslinking agent), with attendant control of particle size, porosity, swellability, surface area, and other aspects of its architecture affecting eventual use; and its good general mechanical and chemical stabilities, though also with the ability to be controllably decorated with any of a wide variety of functional groups. In ion exchange resins, which are manufactured in large quantities for deionizing water and many other purification processes, these functional groups may consist of sulfonic, carboxylic, phosphinic or phosphonic acids or phosphonic ester acids or their salts, or amines or their salts, or quaternary ammonium or phosphonium hydroxides or other of their salts; recoverable solid resins for general acid catalysis would bear sulfonic or phosphoric strong acid groups; chelating resins that recover toxic or expensive metal ions from wastewater may contain combinations of amino and sulfonate, phosphinate, phosphonate or carboxylate groups, along with hydroxyl, ether, thiol, sulfide, ketone, phosphine, phosphoramidate or other Lewis base groups; certain such functional groups, including those having the form of crown ethers [K. Kimura, in K. Takemoto, K. Inaki and R. M. Ottenbrite "Functional Monomers and Polymers", Marcel Dekker NY y1987 p349–422], amides [A. Akelah and A. Moet "Functionalized Polymers and Their Applications", Chapman & Hall NY y1990], or 1,3-diketones [H. Yeh, B. E. Eichinger, N. H. Andersen, ACS Polym. Prepr. y1981 v22 p184] may in particular coordinate with metal ions to activate their negative counterions for phase-transfer catalyzed nucleophilic substitution or other reactions, or may hold platinum or other catalytic heavy metal species so that these are conserved and re-used from one reaction to the next, while others such as cyclic amidines like 1,8-diazabicyclo[5.4.0]undec-7-ene ("DBU")[M. Tomoi, Y. Kato and H. Kakiuchi, Makromol. Chem. y1984 v185 p2117–2124] are strong though non-nucleophilic bases for organic reactions or anion exchange; halosilyl, haloalkyl, haloacyl, halophosphinyl, halophosphonyl or halosulfonyl functional groups, or anhydride or azlactone functional groups, can covalently bind to other organic molecules so that parts of these are protected while other parts are being chemically modified, the whole later released, such as in solid-phase synthesis of polypeptides, polysaccharides or polynucleotides, or themselves act as agents for catalysis or molecular recognition, as with proteinic enzymes, antibodies or antigens that have been polymer-bound. Phosphorus-containing functional groups can also improve fire resistance in a functional polymer.

While functional polymers may be prepared by polymerization of monomers that already contain the desired functional groups, more commonly they are made by chemically functionalizing or modifying other existing polymer matrices—most commonly, crosslinked polystyrene—as prepared from common monomers through established polymerization recipes that give well-defined and desirable particle and matrix structures and properties. However, existing such modification methods of preparing functional polymers often suffer from disadvantages of hazardous or expensive ingredients or conditions, that result in products that are intrinsically deficient in activity or stability or both [G. D. Darling and J. M. J. Fréchet "Dimethylene spacers in functionalized polystyrenes", in J. L. Benham and J. F. Kinstle, Eds. "Chemical Reactions on Polymers", ACS Symp. Ser. v364, American Chemical Society, Wash. D.C., y1988 p24–36]. For example, the chloromethylation route to the most common anion-exchange and chelating polystyrene-based resins uses or generates highly carcinogenic species, and results in benzyl-heteroatom bonds that are unstable to many conditions of eventual use or regeneration; bromination/lithiation, another general route to functional polymers, employs expensive and sensitive organometallic reagents and, like sulfonation, results in aryl-heteroatom functional groups that may be unstable in acidic conditions. Functional polymers containing aliphatic spacer groups of at least two carbons between polystyrene phenyl and functional group heteroatom would not show either type of chemical instability, and moreover, the deeper penetration of their dangling functional groups into a fluid phase permeating the polymer matrix often allows better and faster interactions with soluble species therein [A. Deratani, G. D. Darling, D. Horak and J. M. J. Fréchet "Heterocyclic polymers as catalysts in organic synthesis. Effect of macromolecular design and microenvironment on the catalytic activity of polymer-supported (dialkylamino)pyridine catalysts." Macromolecules y1987 v20 p767]. Several such spacer-containing functional polymers have been prepared via electrophilic aromatic substitution—either chloromethylation or bromination/lithiation—of aryl nuclei in crosslinked styrene-divinylbenzene copolymer, albeit through tedious multistep syntheses [Darling and Fréchet y1988 ibid].

Instead of on styrenic phenyl, modification reactions can be performed on the vinyl groups of polymeric 1-(vinylphenyl)ethylene repeat units. These vinyl groups may be prepared from formyl, chloromethyl, bromoethyl or 1,2-dibromoethyl functional group precursors [M. J. Farrell, M. Alexis and M. Trecarten, Polymer y1983 v24 p114; Darling and Fréchet y1988 ibid; T. Yamamizu, M. Akiyama and K. Takeda, React. Polym. y1985 v3 p1731], or remain from anionic [Y. Nagasaki, H. Ito, T. Tsuruta, Makromol. Chem. y1968 v187 p23] or even free-radical [M. C. Faber, H. J. van den Berg, G. Challa and U. K. Pandit, React. Polym. y1989 v11 p117] copolymerization of monomer mixtures that include divinylbenzene. Radical copolymerization with divinylbenzene is a particularly simple way to form a polymer that contains such vinyls, that moreover have here the advantage of being site-isolated; indeed, Rohm and Haas supplies a commercial product, "Amberlite® XAD-4 nonionic polymeric adsorbent", which analysis thereof indicates to be undoubtedly made by radical copolymerization of a mixture of divinylbenzene and ethylstyrene—which mixture, containing both meta and para isomers of each, is commercially provided under the name "technical-grade divinylbenzene" ["Aldrich Catalog" y1997], and so which resulting polymer may be called "poly(divinylbenzene)"—and which contains 30 mol % of polymeric 1-(vinylphenyl)ethylene repeat units, with the remaining repeat units consisting of polymeric 1-(ethylphenyl)ethylene and crosslinking polymeric bis (ethylene)phenyl repeat units [Faber et al y1989 ibid]. Through electrophilic, nucleophilic, radical, transition-metal catalyzed or other additions to such polymeric 1-(vinylphenyl)ethylene repeat units [W. Obrecht, Y. Seitz and W. Funke, Makromol. Chem. y1976 v177 p2235; Faber et al y1989 ibid; Z. Zhengpu, P. Hodge and P. W. Stratford, React. Polym. y1991 v15 p71; J. P. Gao, F. G. Morin and G. D. Darling, Macromolecules y1993 v26 p1196], or by their radical-induced graft copolymerizations with various monomers [T. Brunelet, M. Bartholin and A. Guyot, Angew. Makromol. Chem. y1982 v106 p79], have been provided a wide variety of functional groups, including of the form Ps-CH$_2$—CH$_2$—X, wherein Ps represents a crosslinked polystyrene matrix connecting through phenyl, and X a functional group connecting through a heteroatom, that features advantageous dimethylene spacer [Gao et al y1993 ibid]. Were X to be a functional group linking through carbon, then any heteroatom in the functional group would be ultimately connected to polystyrene phenyl via at least 3 carbon atoms, leading to still greater chemical stability since elimination reactions here too become less favoured, and also still greater activity and interaction with species in permeating fluid through being extended still further away from the polymer backbone.

Useful functional groups such as crown ethers [K. Kimura et al y1987 ibid] may be incorporated into functional polymers through copolymerization with such functional comonomers as modified acrylate, methacrylate or styrene. As previously mentionned though, modification of an existing optimal polymer matrix is a route often to be preferred for its simplicity, versatility, economy and better product properties. Though functional groups such as crown ethers, amides, amidines, ureas, esters, 1,3-dicarbonyl compounds, carboxylic acids, amines and polyols have been incorporated into functional polymers by other routes—typically through reaction with (chloromethyl)polystyrene and consequent labile benzylic ether or other bonds—and though C—H bonds in such compounds have been added across alkene functionalities in small molecules (often accompanied by polymerization of the alkene)[C. Walling and E. S. Huyser, Org. React. y1963 v13 p91–149], and the corresponding C. radicals have been used to form polymers with functional end groups [J. K. Rasmussen et al, in C. M. Starks "Phase-Transfer Catalysis", Wash. D.C. y1985 p116–127], and though polymeric 1-(vinylphenyl)ethylene repeat units have been made to undergo radical-induced graft copolymerizations with various monomers [T. Brunelet, M. Bartholin and A. Guyot, Angew. Makromol. Chem. y1982 v106 p79], the prior art does not contain examples of such repeat units being monofunctionalized through anti-Markovnikov addition of carbon-centered radicals on their vinyls, nor of the products of these reactions by this or any other routes.

OBJECTS OF THE INVENTION

It is an object of this invention to provide a functional polymer bearing carbon-linked functional groups on dimethylene spacers for separation or reactive processes in chemical manufacture or analysis.

It is another object of this invention to provide a functional polymer that can be prepared using readily-available materials and simple conditions and apparatus.

It is another object of this invention to provide a functional polymer, the architecture of whose polymer matrix (e.g. particle size and shape, porosity, swellability, surface area), and type, arrangement and number of whose functional groups, can be controlled.

It is another object of this invention to provide a functional polymer whose functional groups are stable, active, and accessible to a permeating fluid.

It is another object of this invention to provide a functional polymer bearing functional groups that are ether, polyether, crown ether, cryptand, lariat ether, amide, urea, amidine, ester, amine, carboxylic acid, or combinations thereof, in type, arrangement and number sufficient to confer or contribute towards acidity, basicity, ion exchange, fire-resistance, wettability, chelation, coordination, extraction, separation, sorption, density, permeability, catalysis, selectivity, hydrophilicity, reactivity, separability, suspendability, binding of ions, binding of organic molecules, binding of polypeptides, binding of polysaccharides, binding of polynucleotides, molecular recognition, filterability, convertability to other functional groups, or other desirable qualities, or combinations thereof, in a separation medium, chromatographic medium, purification medium, ion-exchange medium, chelating medium, solid-phase non-nucleophilic base, solid-phase reagent, solid-phase catalyst, solid-phase phase-transfer catalyst, solid-phase protecting agent, support for solid-phase synthesis, chemical intermediate, or other application of a functional polymer, or combinations thereof.

SUMMARY OF THE INVENTION

In accordance with the invention there is provided a functional polymer with carbon-linked functional groups on dimethylene spacers, comprising repeat units of the form —CH[Ph-CH$_2$CH$_2$—X]—CH$_2$—, that are products of reaction between polymeric 1-(vinylphenyl)ethylene repeat units and an organic compound H—X, wherein X is a functional group linked through a carbon atom.

In accordance with another aspect of the invention, there is provided a method of preparing a functional polymer, by reacting polymeric 1-(vinylphenyl)ethylene repeat units with an organic compound H—X in the presence of free radicals, wherein X is a functional group linked through a carbon atom.

In accordance with a preferred embodiment of the invention, there is provided a functional polymer prepared from H—X, wherein X is a functional group linked through a carbon atom, said carbon atom also being $sp^2$-hybridized and doubly bonded to an oxygen, or being $sp^3$-hybridized and singly bonded to an oxygen, or being $sp^3$-hybridized and singly bonded to a nitrogen that is also singly bonded to an $sp^2$-hybridized carbon, or being $sp^3$-hybridized and singly bonded to a nitrogen and also to an $sp^2$-hybridized carbon, or being $sp^3$-hybridized and singly bonded to two $sp^2$-hybridized carbons.

In accordance with a preferred embodiment of the invention, there is provided a method of preparing a functional polymer, by reacting polymeric 1-(vinylphenyl) ethylene repeat units with an organic compound H—X in the presence of free radicals, wherein X is a functional group linked through a carbon atom, said carbon atom in H—X also being $sp^2$-hybridized and doubly bonded to an oxygen, or being $sp^3$-hybridized and singly bonded to an oxygen, or being $sp^3$-hybridized and singly bonded to a nitrogen that is also singly bonded to an $sp^2$-hybridized carbon, or being $sp^3$-hybridized and singly bonded to a nitrogen and also to an $sp^2$-hybridized carbon, or being $sp^3$-hybridized and singly bonded to two $sp^2$-hybridized carbons.

In accordance with a preferred embodiment of the invention, there is provided a functional polymer comprising repeat units of the form —CH[Ph-CH$_2$CH$_2$—X]—CH$_2$—, wherein X is a carbon-linked functional group, and H—X comprises an N-alkylamide, N-alkyl urea, crown ether, aza crown ether, polyethylene glycol, N-alkyl amidine, amino acid residue, 1,3-diketone, 1,3-diester, or combinations thereof.

In accordance with a preferred embodiment of the invention, there is provided a functional polymer comprising repeat units of the form —CH[Ph-CH$_2$CH$_2$—X]—CH$_2$—, wherein X is a carbon-linked functional group, and H—X is N-methyl pyrrolidinone, dimethyl acetamide, tetramethylurea, N,N'-dimethylpropyleneurea, 1,8-diazabicyclo[5.4.0]undec-7-ene, 2,4-pentanedione, diethylmalonate, 18-crown-6, dicyclohexano-18-crown-6, polyethyleneglycol methyl ether 350 g/mol, 2-chloroethyl ether, 2-hydroxyethyl ether, N-methylmorpholine or N-acetyl leucine.

In accordance with a preferred embodiment of the invention, there is provided a method of preparing a functional polymer, by reacting polymeric 1-(vinylphenyl) ethylene repeat units with an organic compound H—X in the presence of free radicals, wherein X is a functional group linked through a carbon atom, and H—X comprises an N-alkylamide, N-alkyl urea, crown ether, aza crown ether, polyethylene glycol, N-alkyl amidine, amino acid residue, 1,3-diketone, 1,3-diester, or combinations thereof.

In accordance with a preferred embodiment of the invention, there is provided a method of preparing a functional polymer, by reacting polymeric 1-(vinylphenyl) ethylene repeat units with an organic compound H—X in the presence of free radicals, wherein X is a functional group linked through a carbon atom, and H—X is N-methyl pyrrolidinone, dimethyl acetamide, tetramethylurea, N,N'-dimethylpropyleneurea, 1,8-diazabicyclo[5.4.0]undec-7-ene, 2,4-pentanedione, diethylmalonate, 18-crown-6, dicyclohexano-18-crown-6, polyethyleneglycol methyl ether 350 g/mol, 2-chloroethyl ether, 2-hydroxyethyl ether, N-methylmorpholine or N-acetyl leucine.

In accordance with a preferred embodiment of the invention there is provided a functional polymer with carbon-linked functional groups on dimethylene spacers that has been prepared from a radical copolymer polymer of monomers comprising divinylbenzene.

In accordance with a preferred embodiment of the invention there is provided a functional polymer with carbon-linked functional groups on dimethylene spacers that has been prepared from a radical copolymer of monomers consisiting of meta-divinylbenzene and para-divinylbenzene and meta-ethylstyrene and para-ethylstyrene.

In accordance with a preferred embodiment of the invention there is provided a functional polymer with carbon-linked functional groups on dimethylene spacers that also comprises other functional groups.

In accordance with a preferred embodiment of the invention there is provided a functional polymer with carbon-linked functional groups on dimethylene spacers, said functional groups comprising ether, polyether, crown ether, cryptand, lariat ether, amide, urea, amidine, ester, amine, carboxylic acid, or combinations thereof, in type, arrangement and number sufficient to confer or contribute towards acidity, basicity, ion exchange, fire-resistance, wettability, chelation, coordination, extraction, separation, sorption, density, permeability, catalysis, selectivity, hydrophilicity, reactivity, separability, suspendability, binding of ions, binding of organic molecules, binding of polypeptides, binding of polysaccharides, binding of polynucleotides, molecular recognition, filterability, convertability to other functional groups, or other desirable qualities, or combinations thereof, in a separation medium, chromatographic medium, purification medium, ion-exchange medium, chelating medium, solid-phase non-nucleophilic base, solid-phase reagent, solid-phase catalyst, solid-phase phase-transfer catalyst, solid-phase protecting agent, support for solid-phase synthesis, chemical intermediate, or other application of a functional polymer, or combinations thereof.

BRIEF DESCRIPTION OF THE DRAWINGS

In drawings which show preferred embodiments of the invention.

DESCRIPTION OF PREFERRED EMBODIMENTS

Figure 1:
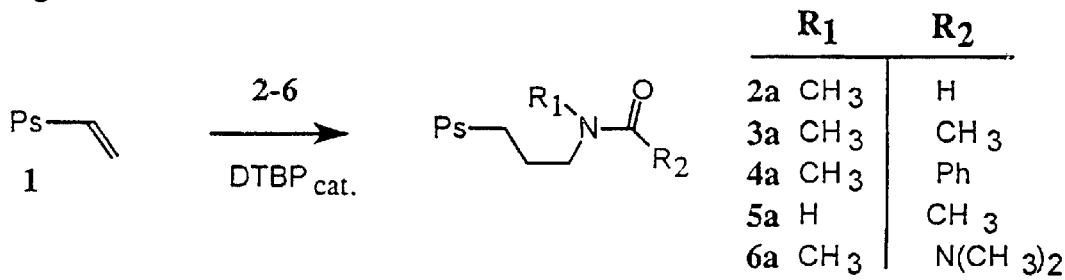
FIG. 1 shows radical addition of N-alkylamides onto vinyl groups of polymeric 1-(vinylphenyl)ethylene repeat units in crosslinked polystyrene.
Figure 2:
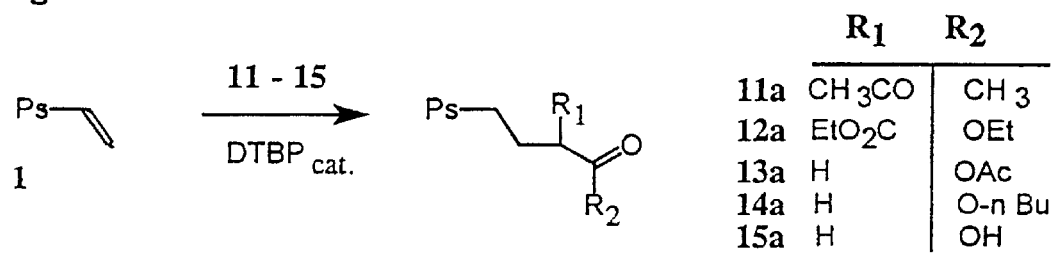
FIG. 2 shows radical addition of carbonyl compounds onto vinyl groups of polymeric 1-(vinylphenyl)ethylene repeat units in crosslinked polystyrene.
Figure 3:
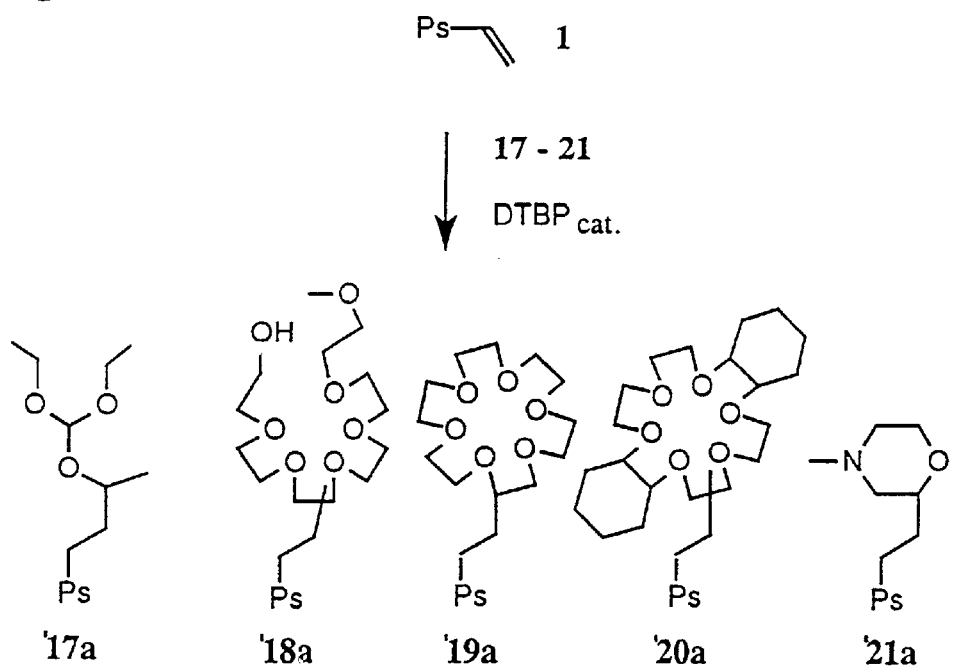
FIG. 3 shows radical addition of ether compounds onto vinyl groups of polymeric 1-(vinylphenyl)ethylene repeat units in crosslinked polystyrene.

Generated through abstraction of H. from H—X (wherein X is an organic compound lined through carbon) by initiator-derived R. or other intermediate radicals, the stability of carbon radicals that are $sp^2$ carbonyl (e.g. H—X being an aldehyde or formyl ester or amide), or $sp^3$ and singly bonded to an oxygen (e.g. in an ether), or to a nitrogen that is also singly bonded to an $sp^2$ carbon (e.g. in an N-alkyl amide, urea or amidine), or to both a nitrogen and a carbonyl (e.g. in an amino acid residue), or to two $sp^2$ carbons (e.g. in 1,3-diketones, -ketoesters or -diesters), fall within the range necessary to support a chain reaction in which HX is ultimately added to vinylaryl in anti-Markovnikov fashion to generate Ar-CH$_2$CH$_2$—X, in which carbon-linked functionalities X are connected to aryl via dimethylene spacers, that are linkages not subject to the chemical instabilities of shorter spacers [C. Walling, M. S. Kharasch and F. R. Mayo, J. Am. Chem. Soc. y1939 v61 p2693–2696; H. H. Vogel, Synthesis y1970 p99–141; Walling & Huyser y1963 ibid; Friedman and Schechter, Tetrahedron Lett. y1961 p238; K. U. Ingold and D. Griller, Acc. Chem. Res. y1976 v9 p13–19]. For vinylaryl small molecules, including styrene, this addition does not compete favourably with radical polymerization of the vinylaryl. However, vinylaryl groups that are already part of a crosslinked polymer, particularly those of the 1-(vinylphenyl)ethylene repeat units of a radical copolymer of divinylbenzene in which all polymer bound vinyls that were close to other vinyls have been consumed during its original polymerization, are site-isolated and so incapable of reaching other vinyls to react with under radical conditions, and so will remain available to react with H—X, to produce, through a method of the invention, carbon-linked functional groups derivatives on dimethylene spacers in a functional polymer of the invention: from H—X comprising where X is a functional group linked through carbon, which carbon is also $sp^2$ carbonyl (e.g. H—X being an aldehyde or formyl ester or amide: see 2 in the Examples below), or $sp^3$ and singly bonded to an oxygen (e.g. in an ether: see FIG. 3, and 17–21 in the Examples below), or to a nitrogen that is also singly bonded to an $sp^2$ carbon (e.g. in an N-alkyl amide: see FIG. 1, and 2–5 and 7 in the Examples below; or an N-alkyl urea: see FIG. 1, and 6 and 9 in the Examples below; or an N-alkyl amidine: see 10 in the Examples below), or both a nitrogen and a carbonyl (e.g. in an amino acid residue: see 22 in the Examples below), or to two $sp^2$ carbons (e.g. in 1,3-diketones: see FIG. 2, and 11 in the Examples below; and 1,3-ketoesters or -diesters: see FIG. 2, and 12 in the Examples below).

In any of the above reactions, excess of reagents may be used, and reaction continued, until maximum content of a carbon-linked functional group on dimethylene spacer is obtained, even to 30 mol % or more of total polymeric repeat units when starting from polymer precursors having sufficient polymeric 1-(vinylphenyl)ethylene repeat units, such as certain poly(divinylbenzene) copolymers including commercial Amberlite® XAD-4; or a limited amount of reagent may be employed, or the reaction terminated early, and some polymeric precursor repeat units remain, which can either be left unreacted, or can be made to react in another method of the invention, or made to undergo some other reaction, either at the same or some later time. In particular, only a few carbon-linked functional groups may be necessary on a functional polymer for application as a support for solid-phase synthesis of oligo- or poly-nucleotides, peptides, saccharides or other relatively large molecules. The radical addition method of the invention may be pursued before, after or simultaneous with other modifications of a starting polymer. In all these ways, a functional polymer with carbon-linked functional groups on dimethylene spacers of the invention may or may not comprise other carbon-linked functional groups on dimethylene spacers, and may or may not comprise other repeat units having other structures or functional groups, possibly contributing other desirable qualities of density, solvent wettability or permeability, dispersability, stabilization of magnetic or other loaded particles, buffering capacity, or other desirable qualities, or combinations thereof.

Di-t-butyl peroxide (DTBP) was the preferred radical initiator, since the AIBN-generated α-nitrile radical was not reactive enough, and also typically, a reaction temperature of 100–120° C. was required for the reactions to proceed than the preferred range of decomposition temperatures for this initiator.

Table 1 lists the addition products of some typical small molecule amides. In the case of N,N-dimethylformamide (DMF), the double bond content nearly completely disappeared, after stirring for 3 days in the presence of DTBP at 125° C. to give a mixture of products 2a and 2b. Abstraction of the carbonyl-bonded hydrogen atom results in the formation of the N,N-dimethyl amide 2b ($^{13}$C NMR: 171 ppm; IR: 1655 cm$^{-1}$; >N—CO—CH$_2$—). However, abstraction of the hydrogen atom of the nitrogen-bonded methyl group also yields N-propyl-N-methyl formamide 2a ($^{13}$C NMR: 161 ppm; IR: 1684 cm$^{-1}$; >N—CO—H). Solid state $^{13}$C NMR shows an approximately 1:1 ratio of a mixture which is consistent with the results reported for the similar small molecules [ ] Friedman and Schecter y1961 ibid]. Similarly, addition of N,N-dimethylacetamide and N,N-dimethylbenzamide to (vinyl)polystyrene gave only N-propyl-N-methylacetamide 3a and N-propyl-N-methylbenzamide 4a, respectively. Cyclic N-methylamide N-methylpyrrolidinone (NMP) also gave good yields of the possible addition products 7a–c although the exact proportions could not be determined.[20] N-methylacetamide, acetamide and formamide showed none of the addition products 5a and 8a respectively. Substituted ureas such as N,N,N', N'-tetramethylurea and DMPU were succesful in adding to the residual vinyl groups although in moderately low yeilds of 6a and 9a and 9b. The addition of an N-acetyl α-amino acids was also performed (22).

Cyclic amidines such as DBU behave similarly to amides and gave an addition product 10a with the characteristics of a non nucleophilic strong base. However, the precise site of addition of this product onto the pendant vinyl groups could not be determined. Other amines such as piperidine, diisopropylethylamine, tributylamine or N-methylimidazole did not succeed significantly in modifying the residual vinyl groups.

TABLE 1

| Product | Amide derivative | mole ratio | Alkene | solvent | time | meq/g | yield % |
|---|---|---|---|---|---|---|---|
| 2a,2b | Dimethylformamide (2) | 100 | 1a | toluene | 72 | 0.94 | 52 |
| 3a | Dimethylacetamide (3) | 25 | 1a | neat | 72 | 0.73 | 29 |
| 4a | Dimethylbenzamide (4) | 3 | 1b | o-xylene | 48 | 0.71 | 42 |
| 5a | N-methylacetamide (5) | 30 | 1a | neat | 72 | — | — |
| 6a | Tetramethylurea (6) | 10 | 1b | o-xylene | 48 | 0.31 | 15 |
| 7a-c | N-methylpyrolidinone(7) | 10 | 1c | neat | 48 | 0.83 | 32 |
| 8a | Formamide (8) | 10 | 1b | toluene | 48 | — | — |
| 9a, 9b | N,N'dimethyl Propyleneurea (9) | 10 | 1c | neat | 48 | 0.60 | 21 |

TABLE 1-continued

| Product | Amide derivative | mole ratio | Alkene | solvent | time | meq/ g | yield % |
|---|---|---|---|---|---|---|---|
| 10a-c | 1,8-Diazabicyclo[5.4.0]-undec-7-ene (10) | 6 | 1c | toluene | 72 | 0.55 | 18 |

Reaction with DTBP in neat 1,3-pentanedione gave a highly functionalized resin 11a without any detectable residual vinyl groups. Polymer supported malonic esters 12a were obtained in good yields when the substrate was used neat (without other cosolvents). The addition reaction proceeded, although some residual vinyl groups remained after stirring $CH_3COCH_2COCH_3$ in toluene with (vinyl) polystyrene in the presence of benzoyl peroxide at 100° C. for more than 3 days. Although reports of the free-radical addition of acetic acid and its derivatives such as esters, anhydride and high boiling nitriles such as butyronitrile to alkenes claim these to be in fairly good yields, in our hands these reactions did not proceed. The addition of 1,3 dioxolanes to the pendant vinyl groups, did not in any case give desired products. However the addition of ethyl orthoformate to yield 17a led to the complete disappearance of residual vinyl groups and acid hydrolysis gave the polymer supported formate ester; further hydrolysis gave the corresponding secondary alcohol.

TABLE 2

| Product | Carboxylic derivative | acid mole ratio | Alkene | solvent | time | meq/ g | yield % |
|---|---|---|---|---|---|---|---|
| 11a | 2,4 pentanedione (11) | 100 | 1c | neat | 72 | 1.29 | 71 |
| 12a | Diethylmalonate (12) | 5 | 1c | neat | 48 | 1.20 | 51 |
| 13a | Acetic anhydride (13) | 10 | 1b | toluene | 72 | — | — |
| 14a | butyl acetate (14) | 10 | 1b | toluene | 72 | — | — |
| 15a | Acetic acid (15) | 10 | 1a | toluene | 72 | — | — |
| 16a | 1,3 dioxolane (16) | 10 | 1c | o-xylene | 72 | — | — |

We have found that 18-crown-6 and dicyclohexano-18-crown-6 add nearly quantiatively to (vinyl)polystyrene, with complete disappearance of the vinyl groups to yield 19a and 20a. Polyethylene glycol methyl ether (350 g/mol) also adds via our route to give acyclic polyether phase transfer catalysts 18a. N-methylmorpholine, an example of an aza-crown ether is also a suitable substrate for an addition reaction, giving 21a.

TABLE 3

| Product | Ether | mole ratio | Alkene | solvent | time | meq/ g | yield % |
|---|---|---|---|---|---|---|---|
| 17a | Triethylorthoformate (17 | 5 | 1d | neat | 72 | 1.20 | 51 |
| 18a | Polyethylene glycol (M.W. 350) (18) | 2 | 1c | o-xylene | 48 | 0.63 | 28 |
| 19a | 18-Crown-6 (19) | 1 | 1d | o-xylene | 72 | 1.25 | [a]68 |
| 20a | Dicyclohexano-18-Crown-6 (20) | 0.1 | 1b | o-xylene | 48 | 0.98 | [a]60 |
| 21a | N-methylmorpholine (21) | 10 | 1c | o-xylene | 72 | 0.58 | [a]26 |

[a]obtained from mass gain.

In the examples below, various qualities and utilities of several preferred embodiments the invention are also demonstrated: as solid-phase phase-transfer catalysts (19, 20), bases (21) and chelating agents (22). It is apparent that modifications and adaptations of these specifically described embodiments will occur to those skilled in the art; however, it is to be expressly understood that such modifications and adaptations are within the spirit and scope of the present invention.

EXAMPLES

The following examples describe preferred embodiments of the present invention. Reagents and solvents were used as received unless otherwise indicated. (Vinyl)polystyrene 1a and 1b were prepared by suspension copolymerization of divinylbenzene:ethylstyrene 55:45 mixture, while Amberlite XAD-4 and XAD-16, denoted 1c and 1d respectively, were obtained as a gift from Supelco, and showed FT-IR spectras identical to 1a and 1b after washing in distilled water, sohxlet extraction with methanol and drying. These were found by FTIR [M. Bartholin, G. Boissier and J. Dubois, Makromol. Chem. y1981 v182 p2075–2085] to bear 2.85 and 2.90 mmol reactive vinyl groups/g polymer, or a degree of functionalization $(X_f)$ of 0.34 and 0.35. In general the beads were degassed under vacuum 30–60 min then purged with nitrogen prior to use. The FT-IR spectra of samples ground and pressed into dry KBr pellets were recorded by transmittance with dry ground powder on IR-transparent silicon wafers with a transmittance IR microscope. $^{13}C$ CP-MAS (cross polarization/magic angle spinning) and $^{13}C$ CP-MAS-DD (cross polarization/magic angle spinning/ dipolar-dephasing; τ=45 ms ), solid-phase NMR spectra were obtained on a 100 and 300 MHz spectrometer. Elemental analyses were done by Robertson Microlit Laboratories (NJ).

General Procedure for (vinyl)polystyrene Modification

To (vinyl)polystyrene 1a–d (0.5–10 g, 0.8–40 mmol) suspended in toluene or o-xylene (see table) was added an excess of substrate (1–100 fold) and 5–10% di-tert-butylperoxide (DTBP). The mixtures were heated under $N_2$ at 115–120° C. for 48–72 h with addition of 5–10% DTBP at 24 h intervals and monitored by FT-IR spectroscopy of samples removed. The mixtures were then filtered washed with hot toluene or xylenes and extracted exhaustively in a soxhlet apparatus 18–24 h with acetone, then dried in a vacuum oven 24–48 h to constant weight. The resulting polymer reagents were characterized by FT-IR, $^{13}C$ CP-MAS-DD and elemental analysis.

Ps-CH$_2$CH$_2$—CH$_2$N(CH$_3$)CHO (2a).

FTIR (KBr): 1684 and 1655 cm$^{-1}$; $^{13}C$ CP-MAS NMR (25.1 MHz; "DD"=the peak was also seen in spectrum with t=45 ms dipolar dephasing) δ171, 161, 145 (DD), 127, 40, 37–29, 28, 15 (DD). Anal. Calcd for $(C_{10}H_{12})_{0.45}$ $(C_{10}H_{10})_{0.42}(C_{13}H_{18}NO)_{0.13}$ (52% conversion): C 88.70, H 8.51, N, 1.30. Found. 88.71, H8.55, N, 1.32.

Ps-CH$_2$CH$_2$—CH$_2$N(CH$_3$)COCH$_3$ (3a).

FTIR (KBr): 1652, 990 cm$^{-1}$ (residual C=C). Anal. Calcd for $(C_{10}H_{12})_{0.45}(C_{10}H_{10})_{0.45}(C_{14}H_{19}NO)_{0.10}$ (29% conversion): C 88.61, H 8.44, N, 1.01. Found C 88.66, H 8.49, N, 1.02.

Ps-CH$_2$CH$_2$—CH$_2$N(CH$_3$)COPh (4a).

FTIR (KBr): 1652, 990 cm$^{-1}$ (C=C). $^{13}C$ CP-MAS NMR (100 MHz) δ170, 145 (DD), 127, 40, 37–29, 28, 15 (DD). Anal. Calcd for $(C_{10}H_{12})_{0.45}(C_{10}H_{10})_{0.44}(C_{19}H_{21}NO)_{0.11}$ (42% conversion): C 89.48, H 7.88, N, 1.04. Found C 88.56, H7.76, N, 1.04.

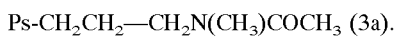
Ps-CH$_2$CH$_2$—CH$_2$NHCOCH$_3$ (5a)

FTIR (KBr): 1652 cm$^{-1}$ weak, 1630 cm$^{-1}$ (C=C) 990 cm-1 (residual C=C); $^{13}C$ CP-MAS NMR (100 MHz) δ145, 127, 40, 28, 15. Anal. Calcd for $(C_{10}H_{12})_{0.45}$ $(C_{10}H_{10})_{0.53}(C_{13}H_{18}NO)_{0.02}$ (5.0% conversion): N, 0.20. Found N, 0.20.

Ps-CH$_2$CH$_2$—CH$_2$N(CH$_3$)CON(CH$_3$)$_2$ (6a).

FTIR (KBr): 1720, 990 cm$^{-1}$ (residual C=C); $^{13}C$ CP-MAS NMR (100 MHz) δ170, 145, 127, 40, 37–29, 28, 15. Anal. Calcd for $(C_{10}H_{12})_{0.45}(C_{10}H_{10})_{0.50}(C_{15}H_{22}N_2O)_{0.04}$ (15% conversion): C 88.9, H 8.46, N 0.85. Found. C 87.25, H 7.92, N 0.86.

Ps-CH$_2$CH$_2$—N-methylpyrolidinone (7a–c).

FTIR (Si wafer) 1700, 1635 and 990 cm$^{-1}$ (peaks disappear); $^{13}C$ CP-MAS NMR: δ173.24, 145, 127, 40, 28, 15. Anal. cald. for $(C_{10}H_{12})_{0.45}(C_{10}H_{10})_{0.41}(C_{15}H_{19}ON)_{0.14}$ (40% conversion): C 8.38, H 8.03, N, 1.16. Found C 88.20, H 7.99, N, 1.16.

Ps-CH$_2$CH$_2$-dimethyltetrahydopyrimidinone (9a, 9b)

FT-IR (KBr): 1649.1 cm$^{-1}$; $^{13}C$ CP-MAS NMR: δ168, 145, 127, 40, 28, 15. Anal. calcd. for $(C_{10}H_{12})_{0.45}$ $(C_{10}H_{10})_{0.47}(C_{15}H_{21}ON_2)_{0.08}$ (21% conversion): C 89.27, H 8.46, N 1.21. Found C 89.56, H 8.39, N, 1.21.

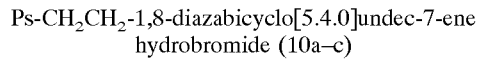
Ps-CH$_2$CH$_2$-1,8-diazabicyclo[5.4.0]undec-7-ene hydrobromide (10a–c)

FT-IR (KBr) 1610.1 cm$^{-1}$ (C=N); $^{13}C$ CP-MAS NMR: δ145, 127, 40, 28, 15. Anal. cald. for $(C_{10}H_{12})_{0.45}$ $(C_{10}H_{10})_{0.47}(C_{19}H_{26}N_2Br)_{0.08}$ (21% conversion): C 86.80 8.14, N 1.48. Found C86.79, H 8.10, N 1.48. The product absorbed acid out of aqueous solution.

Ps-CH$_2$CH$_2$—CH(COMe)$_2$ (11a)

FT-IR (Si wafer) 1720, 1705, 1600, 1635 and 990 cm$^{-1}$ (peaks disappear); $^{13}C$ CP-MAS NMR: δ190, 145 (DD), 135, 127, 109, 40, 28,15 (DD). Anal. Calcd. for $(C_{10}H_{12})_{0.45}(C_{10}H_{10})_{0.29}(C_{15}H_{19}O_2)_{0.26}$ 71% conversion by mass gain.

Ps-CH$_2$CH$_2$—CH(COOEt)$_2$ (12a)

FT-IR (Si wafer) 1739.1 cm$^{-1}$ (C=O), 1635 and 990 cm$^{-1}$ peaks disappear; $^{13}C$ CP-MAS NMR: δ168, 145 (DD), 127, 40, 28, 15 (DD). Anal. cald. for $(C_{10}H_{12})_{0.45}$ $(C_{10}H_{10})_{0.36}(C_{17}H_{23}O_4)_{0.19}$ (51% conversion): 1.20 mmol/g (from mass increase).

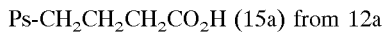
Ps-CH$_2$CH$_2$CH$_2$CO$_2$H (15a) from 12a 2.00 g of 12a was suspended in 40 mL of 5 M NaOH and 5 mL THF. The suspension was then refluxed gently overnight and filtered while hot. The beads were then tranferred to an erlenmeyer flask containing 25 ml 5 M HCl and heated at 80° C. for 3 h before filtration and washing with 1 M HCl 2×20 mL followed by drying in vacuo at 70° C. 24 h. Yields 1.62 g white beads. FT-IR (Si wafer) 3000 (br), 1744, 1728, 1266, 1020 cm$^{-1}$. 1; Anal. Calcd. for $(C_{10}H_{12})_{0.45}$ $(C_{10}H_{10})_{0.36}(C_{12}H_{14}O_2)_{0.19}$: 1.10 mmol/g (pH back titration).

Ps-CH$_2$CH$_2$CH$_2$COOH (15a) from acetic acid

FT-IR (KBr) as in 1.

PS-CH$_2$CH$_2$—CHOH(CH$_3$)CH(OCH$_2$CH$_3$)$_2$ (17a)

FT-IR (Si wafer) 1090, 1060.1(C—O—C), 1635 and 990 cm$^{-1}$ (peaks disappear); $^{13}C$ CP-MAS NMR: δ145, 127, 40, 28, 15. Anal. Calcd. for $(C_{10}H_{12})_{0.45}(C_{10}H_{10})_{0.36}$ $(C_{17}H_{26}O_3)_{0.19}$: 1.20 mmol/g (mass gain).

Ps-CH$_2$CH$_2$-polyethylene glycol mono methyl ether (18a)

1c (5.00 g, 14.1 mmol) and PEG-350 (8.14 g, ~23 mmol) in 10 ml o-Xylenes were heated for 48 h at 125° C. under $N_2$ in the presence of DTBP (0.1 mL, 0.60 mmol) . The beads were filtered and washed with toluene 6×25 ml, acetone 6×25 ml then ether and vacuum dried 24 h at 60° C. Yields 6.40 g white beads. FT-IR (Si wafer) 3350 (OH), 1118.1 cm$^{-1}$ (C—O—C), 1635 and 990 cm$^{-1}$ (peaks disappear); $^{13}C$ CP-MAS NMR: δ145 (DD), 127, 70.8, 40, 28, 15 (DD). Anal. cald. for $(C_{10}H_{12})_{0.45}(C_{10}H_{10})_{0.44}(C_{10}H_{10}$-PEG 350) (28% conversion): 0.63 mmol/g (from mass gain)

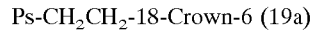
Ps-CH$_2$CH$_2$-18-Crown-6 (19a)

1c (10.00 g, 31.3 mmol) and 18-Crown-6 (10.10 g, 38.2 mmol) in 25 ml o-Xylenes were heated for 72 h at 125° C. under $N_2$ in the presence of DTBP (0.20 mL, 1.20 mmol). The beads were filtered and washed with hot toluene 10×25 ml, hot ethanol 10×25 mL then with ether and vacuum dried 48 h at 60° C. Yields 14.96 g as white beads. FT-IR (Si wafer): 1116.9 1635 and 990 cm$^{-1}$ (peaks disappear); $^{13}$C CP-MAS NMR: δ145 (DD), 127, 71, 40, 28, 15 (DD) Anal. Calcd. for $(C_{10}H_{12})_{0.45}(C_{10}H_{10})_{0.30}(C_{22}H_{34}O_6)_{0.25}$ (68% conversion): 1.25 mmol/g (from mass increase). Addition of this product accelerated a reaction between bromobutane in an organic liquid phase and sodium cyanide in an aqueous phase.

Ps-CH$_2$CH$_2$-Dicyclohexano-18-Crown-6 (20a)

1c (10.00 g, 31.3 mmol) and 18-Crown-6 (10.10 g, 38.2 mmol) in 25 ml o-Xylenes were heated for 72 h at 125° C. under N$_2$ in the presence of DTBP (0.20 mL, 1.20 mmol). The beads were filtered and washed with hot toluene 10×25 ml, hot ethanol 10×25 mL then with ether and vacuum dried 48 h at 60° C. Yields 14.96 g as white beads. FT-IR (KBr) 1120 cm$^{-1}$ (C—O—C); $^{13}$C CP-MAS NMR: δ145, 127, 40, 71.30 (—CH$_2$—O), 28, 15. Anal. Calcd. for $(C_{10}H_{12})_{0.45}(C_{10}H_{10})_{0.35}(C_{30}H_{46}O_6)_{0.20}$ from mass gain. Addition of this product accelerated a reaction between bromobutane in an organic liquid phase and sodium cyanide in an aqueous phase.

Ps-CH$_2$CH$_2$-N-Methylmorpholine hydrobromide (21a)

FT-IR (KBr) 1120.1 (C—O—C); $^{13}$C CP-MAS NMR: δ145, 127, 40, 28, 19.45 (N—CH$_3$), 15. Anal. Calcd. for $(C_{10}H_{12})_{0.45}(C_{10}H_{10})_{0.47}(C_{15}H_{21}ON)_{0.08}$ (21% conversion): C 85.90, H 8.01, N 0.79. Found C 86.03, H 7.89, N 0.79. The product absorbed acid out of aqueous solution.

Preparation of (N-Acetyl-l-Leucine-1-Ethyl) polystyrene (22)

To (vinyl)polystyrene 1a $(C_{10}H_{12})_{0.45}(C_{10}H_{10})_{0.30}(C_8H_7CH=CH_2)_{0.25}$ (2.00 g, 3.96 mmol) was added 1.37 g of N-acetyl L-leucine, 1,5 ml dipentylamine, 10 ml o-Xylenes and t-BPO (0.1 mL) under N$_2$ at 120° C. It was kept at 120° C. for 2 days. The mixture was filtered, washed with 1N NH$_4$OH and sohxlet extracted with acetone overnight. /THF. Vacuum drying overnight gave 2.28 g white beads. FTIR (KBr): 3100 (NH), 1740 cm-1 (COOH), 1652 (CONHR), 990 cm-1 (residual C=C). Anal. Calcd. for $(C_{10}H_{12})_{0.45}(C_{10}H_{10})_{0.42}(C_{10}H_{11}C_4H_8NO)_{0.13}$ (52% conversion): N, 1.20. Found N, 1.17. Beads became strongly coloured when immersed in aqueous solutions containing cobalt, copper or nickel ions, which colour could then be leached by hydrochloric acid.

What is claimed is:

1. A functional polymer that comprises repeat units of the form —CH[Ph-CH$_2$CH$_2$—X]—CH$_2$—, each said —CH[Ph-CH$_2$CH$_2$—X]—CH$_2$— repeat unit being a product of reaction between a 1-(vinylphenyl)ethylene repeat unit and an organic compound H—X, wherein X comprises a carbon atom that is linked to the —CH[Ph-CH$_2$CH$_2$]—CH$_2$— remainder of said —CH[Ph-CH$_2$CH$_2$—X]—CH$_2$— repeat unit in said product as a consequence of said reaction, and said carbon in said H—X also has characteristics selected from being sp$^2$-hybridized and doubly bonded to an oxygen, being sp$^3$-hybridized and singly bonded to an oxygen, being sp$^3$-hybridized and singly bonded to a nitrogen that is also singly bonded to an sp$^2$-hybridized carbon, being sp$^3$-hybridized and singly bonded to a nitrogen and also to an sp$^2$-hybridized carbon, and being sp$^3$-hybridized and singly bonded to two sp$^2$-hybridized carbons.

2. A functional polymer of claim 1, wherein H—X is N-methylpyrrolidinone.

3. A functional polymer of claim 1, wherein H—X is tetramethyurea.

4. A functional polymer of claim 1, wherein H—X is N,N'-dimethylpropyleneurea.

5. A functional polymer of claim 1, wherein H—X is 1,8-diazabicyclo[5.4.0]undec-7-ene.

6. A functional polymer of claim 1, wherein H—X is 2,4-pentanedione.

7. A functional polymer of claim 1, wherein H—X comprises a diester of malonic acid.

8. A functional polymer of claim 1, wherein H—X is diethyl malonate.

9. A functional polymer of claim 1, wherein H—X comprises a crown ether.

10. A functional polymer of claim 1, wherein H—X is 18-crown-6.

11. A functional polymer of claim 1, wherein H—X is 2-chloroethyl ether.

12. A functional polymer of claim 1, wherein H—X is 2-hydroxyethyl ether.

13. A functional polymer of claim 1, wherein H—X comprises a polyethylene glycol.

14. A functional polymer of claim 1, wherein H—X is polyethylene glycol methyl ether 350 g/mol.

15. A functional polymer of claim 1, wherein H—X is N-methylmorpholine.

16. A functional polymer of claim 1, wherein H—X comprises an amino acid residue.

17. A method of preparing a functional polymer that comprises repeat units of the form —CH[Ph-CH$_2$CH$_2$—X]—CH$_2$—, whereby polymer comprising 1-(vinylphenyl)ethylene repeat units is combined with organic compound H—X in the presence of free radicals, wherein X comprises a carbon atom that becomes linked to the —CH[Ph-CH$_2$CH$_2$—]—CH$_2$— remainder of said —CH[Ph-CH$_2$CH$_2$—X]—CH$_2$— repeat unit.

18. A method of preparing a functional polymer of claim 17, whereby said carbon atom in H—X also has characteristics selected from being sp$^2$-hybridized and doubly bonded to an oxygen, being sp$^3$-hybridized and singly bonded to an oxygen, being sp$^3$-hybridized and singly bonded to a nitrogen that is also singly bonded to an sp$^2$-hybridized carbon, being sp$^3$-hybridized and singly bonded to a nitrogen and also to an sp$^2$-hybridized carbon, and being sp$^3$-hybridized and singly bonded to two sp$^2$-hybridized carbons.

* * * * *